Oct. 8, 1963   R. H. BURKS   3,106,528
FILTER CARTRIDGE AND METHOD AND MEANS FOR MAKING THE SAME
Filed March 25, 1957   3 Sheets-Sheet 2
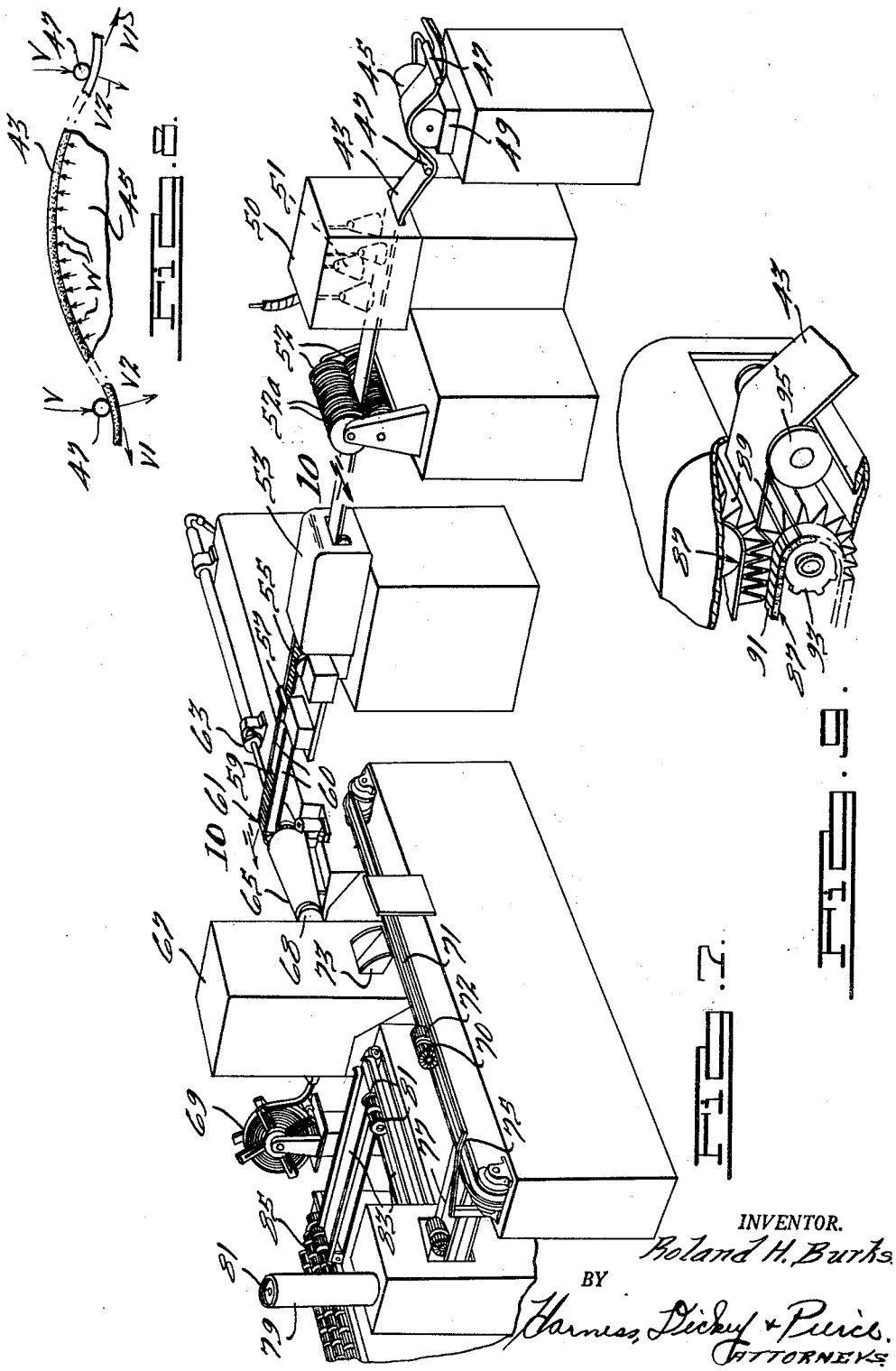
INVENTOR.
Roland H. Burks
BY
Harness, Dickey & Pierce
ATTORNEYS

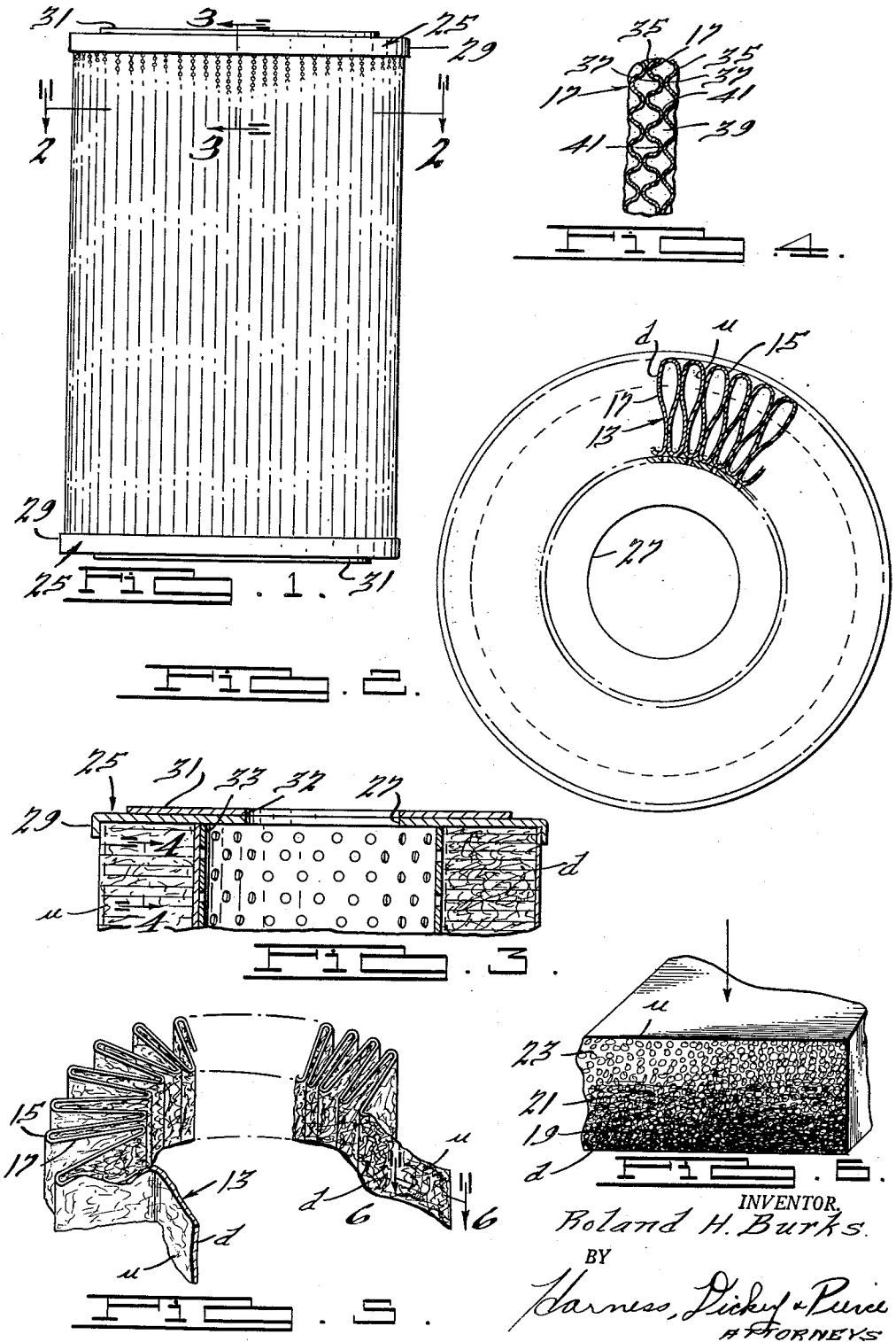

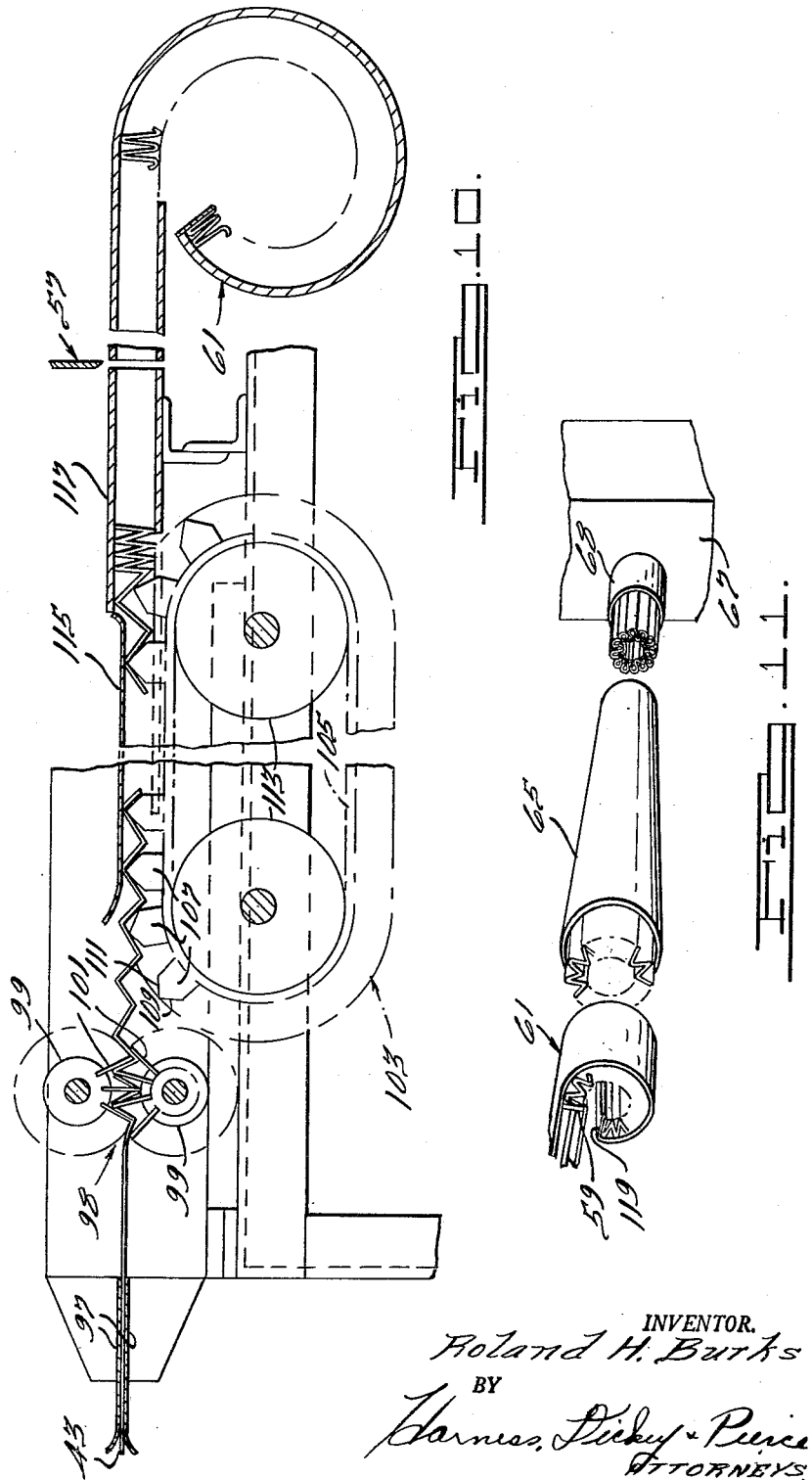

United States Patent Office 3,106,528
Patented Oct. 8, 1963

3,106,528
FILTER CARTRIDGE AND METHOD AND MEANS FOR MAKING THE SAME
Roland H. Burks, Huntington Woods, Mich.
(6323 Landover Road, Cheverly, Md.)
Filed Mar. 25, 1957, Ser. No. 648,355
1 Claim. (Cl. 210—496)

This invention relates to filter cartridges generally and more particularly to disposable paper body filter cartridges and method and means for making the same.

Heretofore, attempts to produce a cheaply made paper body filter cartridge which effects depth-type filtration characteristics of some of the more expensive and elaborately constructed filter cartridges have resulted in constructions as costly to fabricate as the filter cartridges they were to replace. For example, in the patent to Layte, No. 2,675,127, granted April 13, 1954, a paper body filter cartridge is described which employs a lamination consisting of a plurality of paper sheets, each sheet or layer of which is originally formed with a controlled degree of porosity. Consequently, the fabrication into a filter cartridge of the plurality of layers, which necessarily involves pleating thereof, is complicated and of no small task due to the presence of more than one paper layer. Moreover, during its process of manufacture, each individual layer must meet exacting specifications to result in a paper layer having the desired degree of porosity, and thus greater obstacles from practical considerations are encountered in endeavoring to produce a cheaply made paper body filter cartridge employing even a single layer of paper wherewith an attempt is made during manufacture of the single layer to vary the degree of porosity over the thickness of the same. Resin impregnation of such layer or layers that have originally imparted thereto a controlled degree of porosity, and maintenance of this controlled porosity during such impregnation and thereafter, further complicates the problem of producing a low cost paper body filter cartridge which promotes depth-type filtration.

The present invention is directed to improvements over filter type cartridges of the type described in the aforementioned patent and an important object of the invention is to provide a cheaply made paper body filter cartridge which effects depth-type filtration and which can be manufactured without noticeable increase in the cost of fabrication of the same and which employs a paper layer that does not require special properties to be imparted thereto during its manufacture.

It is another important object of the invention to provide a paper body filter cartridge which effects a depth-type filtration by reason of the distribution of cured resin over the thickness of the paper layer and which distribution of cured resin is imparted to the paper layer with extreme simplicity in the manufacturing process.

Other important objects of the invention are to provide a paper body filter cartridge which has an extended useful life by reason of concentrated quantities of cured resin being adjacent one side of the paper layers; to provide a paper body filter cartridge employing a paper layer which has been subjected to an improved impregnation treatment whereby a characteristic, particulate structure is imparted to the layer; to provide the paper layer with a smooth, resin-cured, compacted surface on the downstream side to prevent disintegration of the paper layer and contamination of the filtrate; and to provide a filter cartridge in the form of an annulus wherein the reverse bends thereof are smoothly formed without slightest evidence of damaging or scoring of the paper layer in the area of the bends.

It is still another important object of the invention to provide an improved method and means for manufacturing the filter cartridge of the present invention.

Other objects and advantages of the invention will become apparent during the course of the following description, reference being had to the accompanying drawings wherein preferred embodiments of the invention are clearly shown.

In the drawings:

FIGURE 1 is a front elevation of the preferred form of the filter cartridge embodying the present invention;

FIGURE 2 is a horizontal section taken on the line 2—2 of FIGURE 1;

FIGURE 3 is a vertical section taken on the line 3—3 of FIGURE 1;

FIGURE 4 is an enlarged vertical section taken on the line 4—4 of FIGURE 3;

FIGURE 5 is a fragmentary view in perspective of the filter body or annulus emphasizing the surface characteristics of the upstream and downstream sides of the paper layer;

FIGURE 6 is an enlarged cross-sectional view through the single layer of paper substantially on the line 6—6 of FIGURE 5;

FIGURE 7 is a perspective view showing the means for fabricating the structure of FIGURE 1 on a continuous basis;

FIGURE 8 is an enlarged view depicting the mechanics of the impregnation treatment of the paper layer;

FIGURE 9 is a fragmentary view in perspective with parts broken away of the pleater-conveyor of FIGURE 7;

FIGURE 10 is a side elevation of a modified form of pleater and conveyor employed in the fabrication of the structure of FIGURE 1; and FIGURE 11 is an exploded view showing in displaced relation the several parts operating on the pleated strip to form an annulus.

The filter cartridge comprises a paper body formed into an annulus as best shown in FIGURES 2 and 5. A layer of filter paper 13 is pleated transversely of its length to form a plurality of reverse bends 15 which are interconnected by stretches 17. The bends 15 are smoothly formed without creasing or scoring by the method of the present invention and this is a characteristic feature which completely differentiates it from other paper body filter cartridges heretofore known. This is accomplished by the pleating operation being carried out so that the paper is supported during its critical stage immediately following the formation of the pleats thereby avoiding scoring or damaging of the filter paper in the area of the bends 15. The impregnation of the paper layer is carried out in a manner which will be more particularly described hereinafter so as to control the distribution of resin over the thickness of the layer whereby the average size of the interstices formed by the fibers thereof and the cured resin is varied to effect a depth-type filtration.

In FIGURE 6 there is shown an enlarged cross-sectional view of the single layer of paper, the upstream side being designated $u$ and the downstream side being designated $d$. The cross section of the layer from the upstream side $u$ to the downstream side $d$ has a progressively decreasing size of interstices or voids formed among the paper fibers and the cured resin by reason of the uneven distribution of the cured resin over the thickness of the layer. In the usual case, the area of greatest concentration 19 of cured resin is adjacent the downstream side $d$ of the paper layer, and this concentrated quantity of resin is produced by a combination treatment to be described which comprises compacting or pressing the layer on the downstream side while simultaneously forcing resin impregnant into this side. Consequently, the individual fibers or particles of the paper are coated and interconnected by the concentrated quantities of resin in the area of these fibers. Inwardly of this area of increased quantity of cured resin is an area 21 of intermediate concentration effected by a decreased potential gradient forcing the resin impregnant among the fibers or particles of the paper layer and the area 23 of the paper adjacent the upstream side $u$ is formed with the rarest distribution of cured resin, receiving its reduced quantity of resin principally, it is thought, by capillary action. The individual fibers or particles of the paper layer are coated by the resin impregnant and excess resin impregnant bridges the coated fibers to form interstices or voids which progressively decrease in size toward the downstream side of the layer where the concentration of the resin is the greatest.

Suitable lengths of the paper layer which have been subjected to a special impregnation treatment and transversely pleated in the manner to be described are rolled into an annulus so that the stretches 17 are radially disposed and the free ends of the length of paper layer are brought together and sealed with adhesive. The paper body annulus thus formed is adhesively joined to end caps 25 which seal off the spaces between the stretches to form individual filtering channels for the fluid to be filtered. The end caps 25, as is well known, are formed with centrally located apertures 27 and inwardly turned rim portions 29 which surround and embrace the extremities of the annulus. Secured to each of the end caps 25 is a suitable gasket 31 also having a centrally located aperture 32. The gaskets are employed for fluid tight joining of the end caps of the filter cartridges at the extremities thereof, either one to another in stacked relation or for joining the end caps of the filter cartridge to means within a filter housing. Disposed in the central opening formed by the annulus is a perforated central filter tube 33 which can be formed of relatively stiff paper material or metal and which renders body to the filter cartridge so the same can withstand greater differential pressures. In certain instances, an outside perforated tube may be employed in lieu of an internal tube, or both an internal and an external perforated tube may be employed.

FIGURE 4 shows a detail of a preferred construction of the paper body annulus. Therein is shown an enlarged vertical section through several stretches 17 of the paper layer. The paper layer is formed with corrugations or alternate reverse bends 35 and 37 which extend longitudinally over the length thereof and impart srtength from collapse by the fluid which enters between the stretches under pressure. The reverse bends 35 and 37 are formed of equal size and this is another feature of the present invention as the radially extending channels 39 formed thereby between contiguous portions as at 41 distribute the fluid pressure equally over the length of the filter cartridge between adjacent stretches. The radial channels 39 thus provide access between adjacent stretches for the fluid to be filtered, as well as sludge to be collected, and since they are of equal size, unequal separation between adjacent stretches anywhere around the periphery of the annulus is prevented. The longitudinally extending alternate reverse bends are formed in the paper layer subsequent to the impregnation of the same by opposed rollers as will appear. The paper layer is subjected to moderate curing temperatures immediately following impregnation so as to maintain the uneven distribution of resin imparted to the paper layer by the special impregnation treatment.

With respect to the annulus in which the paper layer is finally formed, the downstream side having the greatest concentration or resin is preferably on the interior thereof and fluid flows around the exterior of the annulus into the radial channels between adjacent stretches of the paper layer to the central opening formed by the annulus. When fluid to be filtered is passing through the paper layer, a depth-type filtration over the thickness of the paper layer is promoted by reason of the differential interstice size existing therein. The larger particles of foreign matter which are in the fluid to be filtered are trapped in the area adjacent the upstream side of the paper layer where the resin concentration and where the voids or interstices are just smaller than these larger foreign particles. The average size of the interstices or voids between the cured resin and paper fibers decreases toward the downstream side of the paper layer as the quantities of resin increases, and prevention of clogging of these smaller size voids is effected by previous capture of the larger particle sizes in the areas through which the fluid to be filtered has previously passed.

The filter cartridge thus has been found to have a greatly increased useful life by virtue of the greater time required to clog the pores or interstices of the paper layer. In a test on one cartridge unit, for example, pumping an oil having a specific gravity of 0.78 through the cartridge at a constant rate of 10 gla./min. while adding Arizona road dust (39% by weight of which had an average particle size 5 microns or below) at a rate of 22.7 grams/100 gallons of flow, more than 270 grams of the dust was filtered from the oil before the pressure drop over the cartridge approached 10 p.s.i. A typical filter cartridge has ability to filter out 99% of particles between 5 and 10 microns and 100% of particles greater than 10 microns. Using normally clean gasoline, the average pressure drop experienced across a complete cartridge is approximately 1½ p.s.i. While the preferred form of the filter cartridge has been described, viz., that of an annulus, it will be apparent that the cartridge may take other forms, as for example, a rectangular box-like type filter cartridge of well known construction which employs pleated layers placed one above the other in stacked relation with the direction of pleats alternately disposed.

The method of fabricating the filter cartridge of the present invention generally comprises subjecting a continuous length of a paper layer to a compacting pressure on one side thereof while resin impregnant is forced into the paper from this one side and preferably the paper layer is placed under longitudinal tension and pressure normal to the one side while simultaneously impregnating the same. Preferably the resin in the paper layer is cured or partially cured to set the resin in the distribution in which it is placed and the paper layer is then passed over opposed corrugated rolls to form the longitudinally extending reverse bends as described. The subjection of the paper layer to a compacting or kissing on one side only distributes the resin differentially over the thickness of the paper layer. The side of the paper layer which has been compacted or kissed in the final article is smoothly formed with a film composed of cured resin and paper fibers and in and adjacent this film are the smallest average size of interstices. In contrast therein, the opposite side of the paper which receives a diminished amount of resin is open and felted by reason of the absence of compacting pressure and the largest average size of interstices are present adjacent this opposite side. Any suitable thermosetting or irreversible thermoplastic resin or combination of resins may be employed but preferably the resin is a phenolaldehyde resin. If desired, resin may also be added during the manufacture of the paper, as for example at the beater, and this has been found not to interfere with the subsequent step of unevenly distributing the resin by the simultaneous compacting and impregnating treatment. The heating step to partially cure the resin so that it will remain in the concentrations in which it is distribtued over the thickness of the paper layer also serves to render the paper sufficiently dry so that the longitudinally extending reverse bends can be accurately formed of equal size and be permanently impressed in the paper layer. It will be apparent that the resin should be sufficiently tacky or viscous so that its tendency to flow is minimized. Simple tests under operating conditions will determine the type and concentration of resin most suitable for a particular application. Usually there is no problem in this regard as most resins have been found to possess enough tackiness to remain in the paper layer throughout the entire process as it is originally placed therein, the only adjustment required being in the amount of dilution of the resin concentrate. Subsequent to the impregnation of the paper layer, the same is subjected to infrared rays so as to fully or partially cure the resin, the amount of cure being dependent upon the type of paper, the type of resin, the degree of saturation of the paper and other factors. This is easily determined for a particular case, and so long as the bank of infrared lamps is made sufficiently long to accommodate the maximum rate of through-put for the paper layer under conditions requiring maximum time of cure, there is no difficulty. After the curing of the layer, the longitudinally extending reverse bends are formed and thereafter the layer is pleated transversely of its length and following this, the pleated layer is rolled into an annulus which is characterized by the smoothly formed bends thereof as compared to prior are filter elements in which the bends of the annulus are sharply formed with cracks and scores over the length of the layer in the area of these bends. The element is also characterized by the tightness with which the annulus is formed so that the bends are contiguous and compacted to impart strength to the nested assembly. The added strength and resistance to damage from handling is due in great measure to the method and means to be described for forming the annulus.

In forming the annulus, the pleated layer is cut into suitable lengths and rolled into the desired size by first subjecting the length of pleated paper to a rapidly increasing unbalanced radially inwardly directed pressure to form a loosely formed open annulus. The loosely formed open annulus is then subjected to a gradually increasing uniformly distributed radially inward pressure to form a completed annulus of desired size. The free ends of the annulus of desired size are joined by suitable adhesive and to retain the annulus in its predetermined final form, a temporary band of paper is secured circumferentially around the exterior of the annulus. Thereafter, a central perforated filter tube is inserted into the central opening formed by the annulus and the extremities of the annulus are sealed by applying under slight pressure end caps to which have been previously applied suitable adhesive whereby the ends of the annulus are sealed. The assembly is then subjected to a final heating step to simultaneously complete the cure of the resin if needed and to cure the adhesive.

The type and amount of resin employed will vary with the characteristics desired in the final product. The following example will illustrate the method of the invention.

*Example 1*

Using a conventional filter paper, a thermosetting resin of the alcohol soluble phenolic type known as Synco 274 (Snyder Chemical Company) was employed. Impregnation was carried out by passing the paper layer over a compacting roll wet on its peripheral surface with a solution of the resin. The paper layer was subjected to longitudinal tension and pressure normal to one side by spring biased tension rolls adjusted to approximately 1 lb. downward force. The tension rolls were disposed on both sides of the compacting roll and the paper layer was passed under each of the tension rolls and over the compacting roll. By such treatment the resin entered the layer from the side contacting the compacting roll and concentrated in the area adjacent this one side. Inwardly of the area adjacent the compacting roll, the paper fibers or particles received a gradually decreasing amount of resin. The area farthest removed from the compacting roll received the least resin but in an amount sufficient to impart resistance to water swelling and deterioration by hydrocarbon solvents. Due to its tackiness and cohesive properties, the resin coated and simultaneously drew the paper fibers or particles together to form intertices or voids. The greater the amount of resin which surrounded and imregnated the fibers, the smaller was the average size of the interstices or voids formed between the resin and the fibers of the paper layer. This action of the resin entering the paper and bridging the fibers is complemented by the simultaneous mechanical deformation of the layer which compresses or densifys the fibers principally on this one side only. The concentration of resin to alcohol was adjusted to nearly paste consistency. Substantially the same distribution of resin imparted to the layer by this treatment was found to exist in the final article as cured resin.

After impregnation of the paper layer, the same was subjected to infrared rays for a travel time of three minutes following which longitudinally extending reverse bends of equal size were formed therein. The paper layer was then pleated transversely of its length. During the pleating of the layer the edges thereof were carefully guided and suitable lengths were cut from a continuously formed planar length of pleated layer. A loosely formed open annulus (approx. 8½" dia.) was shaped by subjecting the cut length of pleated layer to a rapidly increasing unbalanced radially inwardly directed pressure on one side thereof. An annulus of approximately 5" diameter was formed by application to the loosely formed annulus of a gradually increasing uniformly distributed radially inwardly directed pressure. End caps and other parts were adhesively secured to form the completed assembly. The assembly was then placed in an oven maintained at 240° F. for 10 minutes to cure the adhesive and insure the final cure of the resin.

The cartridge thus formed was subjected to tests of its filtering ability as compared to that of a cartridge which was fabricated in a similar manner from an identical paper layer impregnated by a conventional dip method wherein no differential distribution of resin was effected. Under constant flow rate conditions where contaminant was added in slurry form to oil at a constant rate, the pressure drop over the cartridge of the invention was consistently lower than the pressure drop over the above mentioned conventional filter cartridge. In fact, throughout the entire range of 1800 gallons of oil filtered, the pressure drop over the filter cartridge of the invention never approached closer than 18% of the pressure drop of the conventional cartridge. Translated into terms of useful life, it will be apparent that substantial economies can be effected from use of the filter element of the invention. It has been found under actual service conditions that the filter cartridge of the present invention begins effective micron filteration immediately and unlike many prior art cartridges, does not depend upon the building up of a cake of contaminants to provide the media for removing the finer particle sizes. This has been found to be especially important in filtration of aviation fuel and lubricants where contamination generally is mild and a cake of contaminants is slow in forming.

Apparatus to carry out the method of the present invention is shown in perspective in FIGURE 7, certain means being depicted diagrammatically. There a continuous length of paper layer 43 is passed over a compacting roll 45 while being subjected to adjustable downward forces applied to the upper side of the paper layer by a pair of spring based tension rolls 47, each disposed on one side of the compacting roll. The compacting roll is rotatably disposed over a trough 49 filled with the impregnating resin and suitably driven, as by an electric motor (not shown). The periphery of the compacting roll is wet with the resin as it rotates and the resin is carried to the underside of the paper layer and forced into the same by the reactive force developed between the compacting roll 45 and the paper layer 43. FIGURE 8 depicts in detail what is thought to be the mechanics of impregnation of the paper layer accounting for the uneven distribution of resin found to result from such treatment. The downward forces V applied by the adjustable tension rolls 47 are divided into components V1 substantially tangent to the paper layer at the point of contact of the same with the tension rolls 47. These components place the layer under longitudinal tension as the same passes over the compacting roll. The normal components V2 force the paper layer against the compacting roll 45, and the reactive forces W developed between the compacting roll 45 and the paper layer 43 force the resin into the layer under pressure and act as potential gradients for the flow of resin over the thickness of the paper layer, the greatest concentration of resin resulting in the area immediately adjacent the compacting roll and progressively diminishing quantities of resin settle over the thickness of the layer toward the upper side thereof.

The paper which is still wet with impregnant then passes into an oven generally designated 50, beneath a bank of infrared lamps 51. The dimension of the oven 50 longitudinally of the paper layer is designed sufficiently long to accommodate the maximum rate of travel of the layer under conditions of maximum saturation for the layer and maximum time of cure for any resin which will be employed. Upon passing from the oven 50 the layer is passed through a pair of opposed rolls 52, each of which is corrugated as at 52a to form the longitudinally extending reverse bends in the paper layer. The paper layer then passes into a pleater 53 and by well known means (not shown) the feed of the paper layer into the pleater 53 is automatically compensated for, the requirements of the plater taking into account the rate of exit of the paper layer from the opposed rolls 52. Following the pleater 53 is a counter 55 which registers the pleats as the same are formed. Responsive to the counter 55 is a suitable shearing means or cutter 57 which transversely cuts the pleated paper into suitable lengths. The counter 55 and the cutter 57 are adjustable to cut different lengths of pleated paper so as to form annuli of different diameters. Operating after the cutter 57 is a pusher member 59 which on its forward stroke forces the predetermined length of pleated paper into a former means 61. The pusher member 59 near the end of its return stroke is tilted horizontally so that the pleated paper exiting from the pleater will travel over the same and upon completion of the cutting stroke the pusher member 59 is actuated to assume a vertical position behind the cut length of pleated paper so as to repeat its operation of transferring the same into the former means 61. Throughout the travel of the pleated paper from the pleater 53 to the former means 61, the opposite edges of the same are carefully guided by a pair of vertical guide rails 60 to insure that the extremities of the completed annulus will be perpendicular to the longitudinal axis of the same. The pair of guide rails 60 have inturned horizontal portions which extend over the opposite edges of the pleated paper strips.

The former means 61 functions to assemble the cut lengths of pleated paper into loosely formed annuli and upon the termination of the forward stroke of the pusher member 59, a ram 63 functions to force the loosely formed annuli into and through a sizing means 65. The ram 63 is hydraulically or pneumatically actuated in well-known manner and is axially disposed with respect to the former means 61 and the sizing means 65. A tightly formed annulus of the desired size exits from the sizing means 65 into a bander which is shown diagrammatically and generally designated 67. The bander 67 secures temporary paper bands circumferentially about the annulus of desired size to retain the shape of the same. A suitable stock feeder 69 is shown which feeds a continuous length of banding paper stock into the bander 67. Preferably, the bander incorporates means to seal the free ends of the rolled annulus and also incorporates means to insert the perforated filter tube into the central opening of the annulus. From the bander 67, the partially completed filter cartridge 70 with the temporary bands 72 affixed thereto are dropped from a chute 73 onto a conveyor 71 at the end of which is disposed a transfer means 75 by which the partially completed cartridges are transferred to a second conveyor 77. By this conveyor they are carried into a capping mechanism generally designated 79. From above and below the capping mechanism 79 (by means not shown) are fed end caps 81 to each of which has been applied suitable adhesive. The partially completed filter cartridges 70 are vertically disposed in sequence to receive end caps at the extremities thereof and during application of the end caps the assembly is subjected to slight pressure. The cartridges with the end caps applied are carried from the capping mechanism 79 by suitable conveyors 83 to a take-off station 85 where the finally assembled cartridges are transferred to an oven to cure the resin impregnant and adhesive in one heating operation.

FIGURE 9 is an enlarged fragmentary view in perspective of the pleater 53 which comprises a combination pleater-conveyor in lieu of a conventional rotary pleater. It has been found that the use of a rotary pleater of conventional type alone without means to carefully guide and support the bends and stretches in the layer immediately upon their formation has resulted in a large percentage of damaged and imperfectly formed pleats. If means such as that to be described is employed to carefully convey and support the bends and stretches of the pleated layer immediately after their formation, the quality of the bends in the completed annulus is enhanced.

In the embodiment of the pleater shown in FIGURE 9, there is employed a pair of endless belts 87 disposed in spaced-opposed relation, one above the other. Protruding from each of the belts 87 are a plurality of teeth 89 which extend transversely over the width of each thereof, and which are spaced longitudinally over the length of each of the belts 87. Alternate teeth on each of the belts intermesh within the space between the belts along one side of each thereof. Each of the belts is separately driven in unison. The drive means for the lower belt only is shown as an endless link belt composed of a plurality of links 91 which extend laterally from the side of the lower endless belt and which are driven by a gear 93 supplied with rotary force by conventional means (not shown). The intermeshing of the first few cooperating teeth on the pair of endless belts 87 serves to produce the transverse pleats in the length of paper layer 43 as the same is fed into the pleater 53 over a suitable guide roller 95. The remainder of the cooperating teeth subsequent to the first few pleat-forming teeth serve to support and guide the stretches and bends during the critical stages immediately following their formation.

The modified form of pleater shown in FIGURE 10 is along the same general lines as the pleater of FIGURE 9 except that a separate single endless conveyor is employed subsequent to a conventional rotary pleater. In FIGURE 10, the length of paper layer 43 enters the pleater mechanism through a pair of horizontal upper and lower guides 97 from which it is fed into a rotary pleater, generally designated 98, of conventional design comprising a pair of circular disks 99. Spaced about the circumference of each of the disks 99 are a plurality of radially disposed fins 101 which intermesh and form the bends and interconnecting stretches transversely of the paper layer. Immediately following the conventional pleater 98, as close as practicably possible, is a single endless belt conveyor, generally designated 103, which supports and guides the pleats immediately after their formation. The conveyor 103 comprises an endless belt 105 and protruding therefrom are spaced transverse teeth 107. Each of the teeth 107 is substantially trapezoidal in cross section and has angularly disposed faces 109 terminating in an apex 111. The teeth are thus constructed so as to be contiguous with the underside of the stretches and bends of the pleated layer. The apices 111 of the teeth 107 are adapted to support alternate bends formed in the paper layer and the stretches joining these bends are supported by the faces 109 of the teeth 107. The endless belt 105 is supported by a pair of rollers 113 at the ends thereof, one of which is driven by means (not shown) in a well-known manner. Disposed above the conveyor 103 is a plate 115 to lightly guide the pleated paper layer from above as it is conveyed by the endless conveyor 103. Guide means in the form of a pair of guide rails are disposed at the edges of the pleated paper layer as it leaves the conveyor 103 to the former means 61. One such guide rail 117 is shown in section in FIG. 10 and has an upright portion terminating in inwardly bent horizontal portions disposed at right angles to the upper portion so that the edges of the length of pleated paper are embraced from the sides and from above to maintain these edges in parallel relation so that the extremities of the completed annulus will be perpendicular to its longitudinal axis. Also, there are guide means (not shown) extending from the entrance of the pleater mechanism of FIG. 10 to the rotary pleater 98 and where possible, of course, a platform or base plate is provided to support the paper layer from below. The cutter means 57 is diagrammatically depicted in the embodiment of FIG. 10 and operates in response to a counter, as described in connection with FIG. 7. By the pleating means described, the bends of the annulus are smoothly formed without damage in the areas thereof and this is a characteristic of the filter cartridges of the invention not possessed by heretofore known filter cartridges.

The arrangement of the several parts for forming an annulus of desired size is shown in FIG. 11, which is an exploded view of the former means, the sizer means and the bander in displaced relationship. The former means 61 is preferably a spiraled plate, although it will be understood that the former means may take other forms, as for example, a pair of spiraled spaced rail members. Operating at the entering end of the spiraled plate, in a manner previously described, is the pusher member 59 shown in FIG. 11 in its most forward position after having pushed a previously cut length of pleated paper into and about the spiraled plate. A suitable stop, as at 119, may be provided at the exit end of the spiraled plate to retain the predetermined length of pleated paper within the same, thereby providing a loosely formed annulus within the spiraled plate. The spiraled plate operates on one side of the length of pleated paper as it is pushed forwardly with a rapidly increasing unbalanced, radially inward directed pressure. Means such as a ram 63, previously described, operating axially of the spiraled plate transfers the loosely formed annulus into and through the sizer means 65. The sizer means 65 is preferably a hollow frusto-conical member suitably formed of metal, the surface of which gradually tapers to the exit end. The diameter of the sizer means at the exit end is less than the diameter of the entering end. The loosely formed annulus in its travel through the frusto-conical member is tightly formed into an annulus of predetermined size by a uniformly distributed, gradually increasing radially inward directed pressure. The compacted annulus of desired size is transferred into the bander mechanism 67 by suitable means, as for example, a hollow cylindrical portion 68 which extends from the body of the bander mechanism so as to receive and retain the annulus exiting from the sizer means. The frusto-conical member 65 may be made adjustable and likewise the former means 61 as well as the cylindrical portion 68 to accommodate annuli of different sizes. The handling and rolling of the pleated layer into an annulus which at all times tends to straighten out into a planar position is a difficult task and the means described accomplishes this task in an efficient and reliable manner.

It will thus be seen that there has been provided by this invention, an article, a method and apparatus in which the various objects hereinabove set forth together with many thoroughly practical advantages are successfully achieved. While the preferred embodiments of the invention have been shown and described, it is to be understood that the invention is susceptible to variation, alteration and modification without departing from the spirit thereof or scope of the appended claim.

What is claimed is:

A replaceable filter cartridge adapted to be disposed in a filter having an inlet and an outlet, said cartridge being made generally in the form of a hollow cylinder and adapted to be disposed in said filter so that the fluid from said inlet to said outlet flows through the wall of said hollow cylinder, said wall of said cylinder being made of a single layer paper disposed in said filter whereby liquid flows through said paper in one direction toward one side of said paper from said inlet to said outlet, said paper being impregnated substantially throughout with a cured resin which is concentrated in quantities adjacent said one side and diminishing quantities at the other side, said quantities of impregnation decreasing from said one side toward said other side at a substantially and smoothly uniform rate whereby the porosity of said paper decreases at a substantially and smoothly uniform rate from said one side toward said other side.

References Cited in the file of this patent

UNITED STATES PATENTS

| | | |
|---|---|---|
| 437,435 | Howe | Sept. 30, 1890 |
| 2,039,312 | Goldman | May 5, 1936 |
| 2,279,423 | Vokes | Apr. 14, 1942 |
| 2,298,980 | Sloan | Oct. 13, 1942 |
| 2,326,967 | Poelman | Aug. 17, 1943 |
| 2,327,350 | Cruickshank | Aug. 17, 1943 |
| 2,395,301 | Sloan | Feb. 19, 1946 |
| 2,457,958 | Walker | Jan. 4, 1949 |
| 2,539,768 | Anderson | Jan. 30, 1951 |
| 2,631,509 | Muehling | Mar. 17, 1953 |
| 2,675,127 | Layte | Apr. 13, 1954 |
| 2,679,090 | Farr | May 25, 1954 |
| 2,680,899 | Sebok | June 15, 1954 |
| 2,801,009 | Bowers | July 30, 1957 |